Oct. 16, 1962 P. D. GARDNER Re. 25,259
PERSONALIZED SOUND
Original Filed April 4, 1955
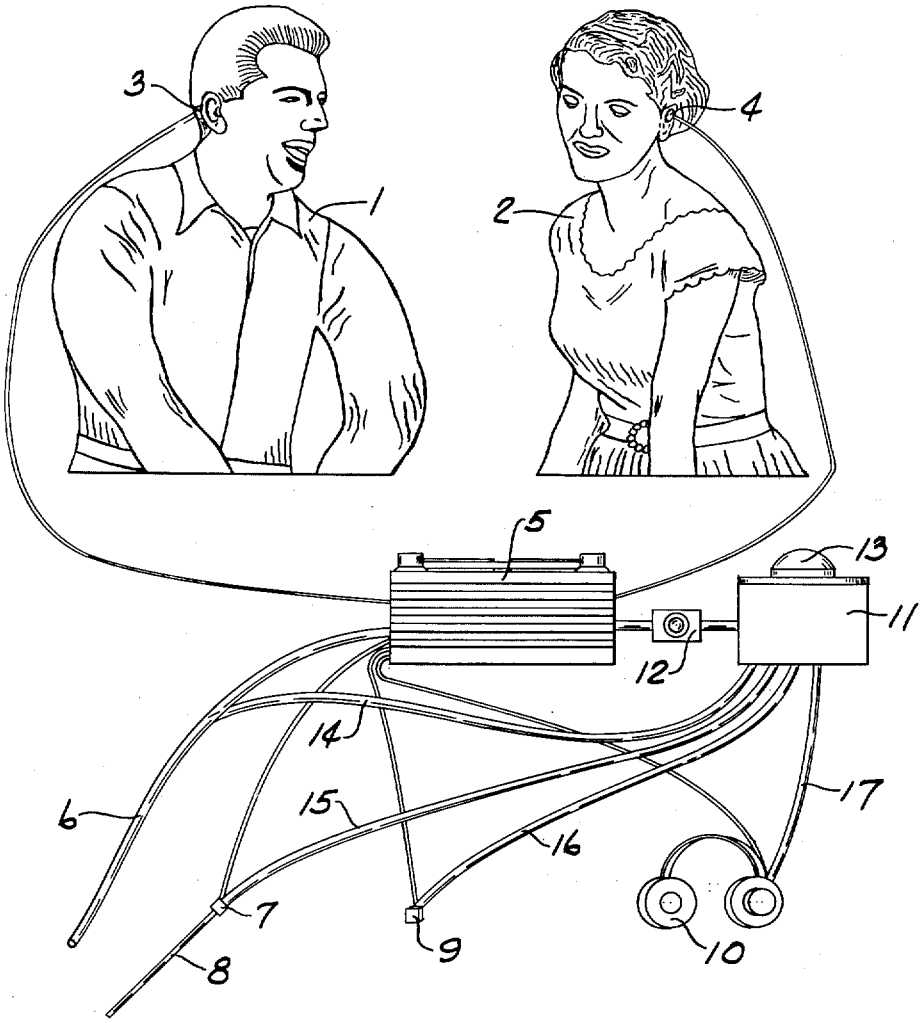
INVENTOR.
PRISCILLA DODGE GARDNER
BY
William J. Carothers
HER ATTORNEY United States Patent Office Re. 25,259
Reissued Oct. 16, 1962

25,259
PERSONALIZED SOUND

Priscilla Dodge Gardner, 9510 Anderson Road, Pittsburgh 37, Pa.

Original No. 2,886,647, dated May 12, 1959, Ser. No. 498,869, Apr. 4, 1955. Application for reissue Feb. 16, 1961, Ser. No. 90,165
3 Claims. (Cl. 179—100.1)

Matter enclosed in heavy brackets [ ] appears in the original patent but forms no part of this reissue specification; matter printed in italics indicates the additions made by reissue.

This invention relates generally to the art of projecting a story independently to one or more individuals and more particularly to synchronizing the senses of sight, sound and smell through independent channels to persons individually.

In public places, it is frequently desirable to project a story to the public but rules and laws prevent the broadcast of sound or smell on the ground that it is a disturbing public nuisance. This situation is found at fairs, expositions, industrial shows, and the like, as well as shows and displays in windows on the street such as programs exhibited in television exhibition halls. Under these circumstances it is necessary to personalize or individualize the sight, sound and smell through independent channels to single recipients who may receive the projected story in synchronization.

The principal object of this invention is to provide simultaneous and independent broadcast of a view or sight, with or without action and sound or [small] *smell.* This invention refers to that which is viewed as a whole or in general as a group or as a theater audience or group but the senses of sound and smell are not audible or effective generally but are piped individually to persons caring to avail themselves of the full story coupled with synchronized sight, sound and smell. The sight or viewing may be by a still object or view or a series of pictures, moving or still, or a setting with pantomime action by individuals. The sound can be by reproduction through tape, wire, or disc methods conducted by individual tubes, earphones, bone conducting oscillators, and the like, applied to individual persons capable of viewing the performance. The smell is likewise conducted individually to persons or small groups by generating an odor and conducting it by pipe or tubes to the persons or group that are viewing and listening. The mere suggestive scent is sufficient to produce the proper effect for odor.

The problem is to produce the viewed subject in silence which is easily done by a series of dropping pictures or moving pictures or a series of pictures fixed on display coupled with the sound and/or odor transmitting the story with consecutive pictures. In pantomime displays having action with human actors the problem is more complex. The actor who acts and mouths the lines must be cued with the reproduction of the sound so that they maintain accurate synchronism. Thus the actor as well as the viewer independently receives the sound.

Another object is the production of a live show with voice, sound and action, all of which is enclosed and wherein the sound is received and then redistributed to the individuals viewing the same by piped channels through tubing or by individual phones, bone oscillators, or electronic mediums. Here the reproduction need not be canned but transmitted directly. The cue problem is not the same as with pantomime but the effect of projecting the whole synchronized story produces the same results when conveyed to individuals without disturbing or otherwise producing a nuisance to the general area of the recipients.

Other objects and advantages appear hereinafter in the following description and claims:

The accompanying drawings show for the purpose of exemplification without limiting the invention or claims thereto certain practical embodiments illustrating the principles of the invention wherein the illustration shows two performers who act in pantomime and the audience sees the action and hears and smells through the individual channels.

Referring to the drawings the pantomime actor 1 and actress 2 are each provided with a phone in the form of hearing aids 3 and 4. These may be oscillators for the mastoid bone such as illustrated at 3, or earphones placed within the ear as indicated at 4. These instruments are hidden from the audience in any suitable manner. Each audioreceiver 3 and 4 is connected to the source of the audio story which may be any form of audio reproducing structure, such as the tape recorder 5. Additional earpnones are provided in the form of the tube 6, the bone oscillator 7 secured to the end of a wand 8 which when touched to a box or a bone on the body, such as a part of the skull, will resound and transmit the audio story to that person of the audience.

An ear type phone 9 that may be placed in the ear of a person of the audience is formed to fit the outer cavity of the ear and transmit sounds to the wearer. A pair of ordinary earphones 10 are also provided. Any or all of these forms of audioreceivers are connected to the same source of audio, such as the tape recorder 5.

The smell generator 11 is connected through the control 12 and to the tape recorder, which upon a given signal will release a predetermined smell with a small fan 13, which forces the odor through the tubes 14, 15, 16 and 17 that parallel the different audio transmitting devices 6, 7, 9 and 10 and supply the proper odor at the proper time during the story that is at the same time acted out by the characters 1 and 2 in pantomime.

I claim:

*1.* The art of producing a theatrical presentation in a hall having a high general noise factor making it impossible to hear an open show which comprises the steps of displaying in a single field of vision one or more living actor participants, reproducing an audible recorded program capable of being shown by the actors in pantomime, conducting the recorded program to the actors individually for their guidance in pantomiming the action of the program and to avoid any increase in the general noise factor of the hall, conducting the recorded program to persons individually making up the audience viewing the pantomime actors without adding to the noise factor in the hall, a participant of the show selectively conducting through direct contact the recorded program to a person individually in the audience to transmit the same during contact without adding to the noise factor in the hall, and selectively conducting odors to individuals of the audience in synchronism with the audible recorded program and the pantomime action.

*2. The art of producing a theatrical presentation in a hall having a high general noise factor making it impossible to hear an open show which comprises the steps of displaying in a single field of vision one or more living actor participants, reproducing an audible recorded program capable of being shown by the actors in pantomime, conducting the recorded program to the actors individually through direct contact with individual sound sources for their guidance in pantomiming the action of the program and to avoid any increase in the general noise factor of the hall, conducting the recorded program to persons making up the audience viewing the pantomime actors individually through direct contact with individual sound sources without adding to the noise factor in the hall.*

*3. The art of producing a theatrical presentation in a hall having a high general noise factor making it impossible to hear an open show which comprises the steps of displaying in a single field of vision one or more living actor participants, reproducing an audible recorded program capable of being shown by the actors in pantomime, conducting the recorded program to the actors individually through direct contact with individual sound sources for their guidance in pantomiming the action of the program and to avoid any increase in the general noise factor of the hall, conducting the recorded program to persons making up the audience viewing the pantomime actors individually through direct contact with individual sound sources without adding to the noise factor in the hall, and selectively conducting odors to individuals of the audience in synchronism with the audible recorded program and the pantomime action.*

References Cited in the file of this patent or the original patent

UNITED STATES PATENTS

| | | |
|---|---|---|
| 1,212,342 | George | Jan 16, 1917 |
| 1,280,542 | Powers | Oct. 1, 1918 |
| 1,307,323 | Stein | June 17, 1919 |
| 1,406,726 | Dobson | Feb. 14, 1922 |
| 1,595,191 | Harris | Aug. 10, 1926 |
| 1,603,431 | Wacker | Oct. 19, 1926 |
| 2,094,681 | Sears | Oct. 5, 1937 |
| 2,159,632 | Morey | Mar. 23, 1939 |
| 2,339,173 | Koren | Jan. 11, 1944 |
| 2,469,986 | Phyfe | May 10, 1949 |
| 2,540,144 | Stern | Feb. 6, 1951 |
| 2,754,365 | Walters | July 10, 1956 |